UNITED STATES PATENT OFFICE.

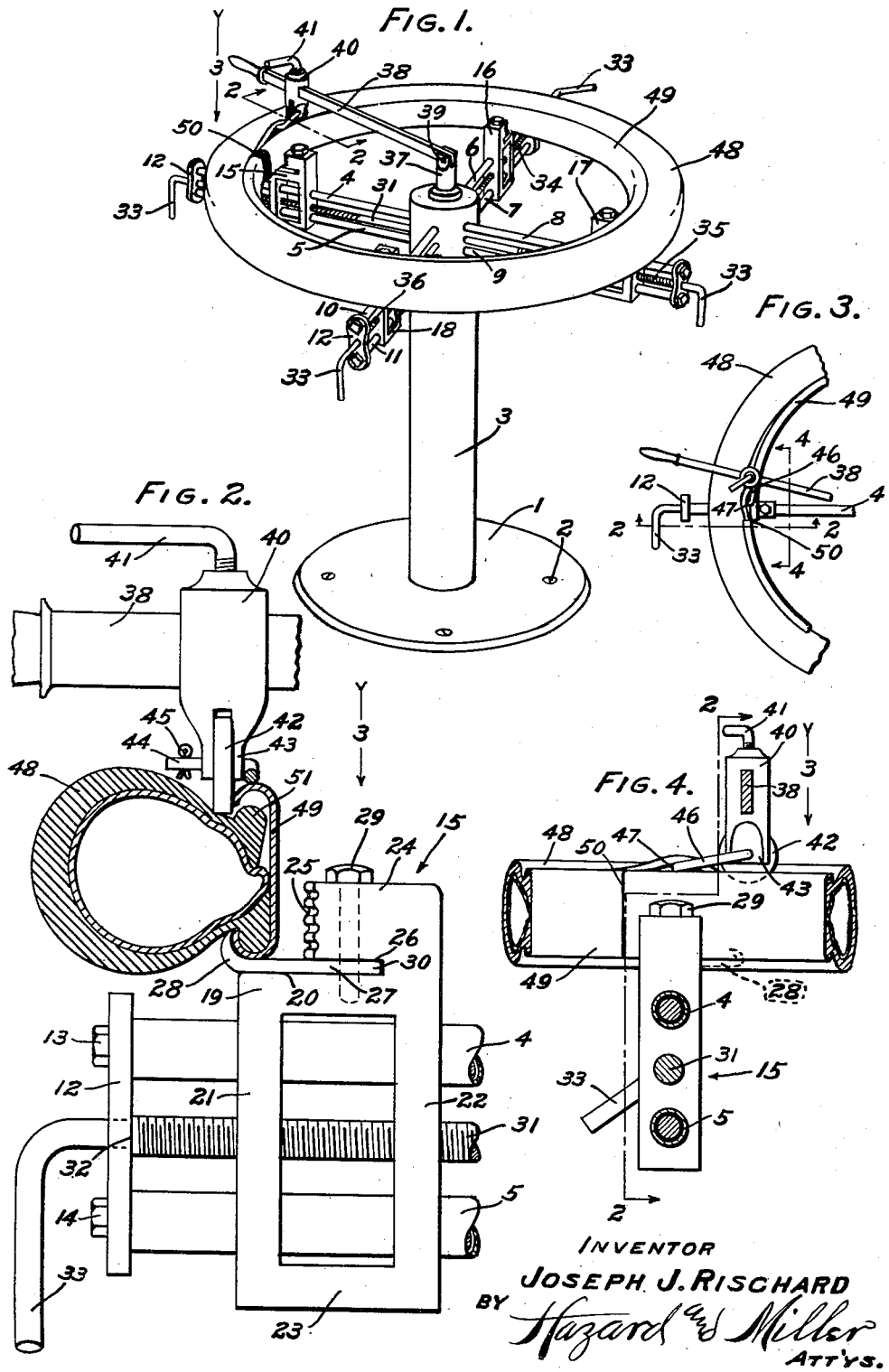

JOSEPH J. RISCHARD, OF PASADENA, CALIFORNIA.

TIRE-MOUNTER AND DEMOUNTER.

1,316,390.     Specification of Letters Patent.     Patented Sept. 16, 1919.

Application filed March 28, 1918. Serial No. 225,337.

*To all whom it may concern:*

Be it known that I, JOSEPH J. RISCHARD, a citizen of the United States, residing at Pasadena, in the county of Los Angeles and State of California, have invented new and useful Improvements in Tire Mounters and Demounters, of which the following is a specification.

My object is to make an improved tire mounter and demounter, and my invention consists in the novel features herein shown, described and claimed.

Figure 1 is a perspective of a tire mounter and demounter embodying the principles of my invention and showing the operation of demounting a tire from a rim.

Fig. 2 is an enlarged fragmentary sectional detail on the lines 2—2 of Figs. 1, 3 and 4.

Fig. 3 is a fragmentary plan on a reduced scale, as indicated by the arrows 3 in Figs. 1, 2 and 4.

Fig. 4 is a fragmentary vertical cross-section on the line 4—4 of Fig. 3.

A circular flat base 1 is adapted to rest upon a floor or other suitable foundation and be secured rigidly in place by inserting cap screws or bolts through the bolt holes 2. The post 3 is formed integral with the base 1 and extends upwardly from its center to a suitable height for conveniently operating and handling the tires. A pair of supporting arms 4 and 5 is rigidly fixed in the upper end of the post 3, said arms being spaced apart one above the other and extending radially and parallel outwardly beyond the circle of a tire rim. A second pair of supporting arms 6 and 7 is likewise fixed in the post 3 at right angles to the arms 4 and 5. A third pair of supporting arms 8 and 9 extends from the post diametrically opposite the arms 4 and 5, and a fourth pair of supporting arms 10 and 11 extend from the post diametrically opposite the arms 6 and 7 and at right angles to the arms 4 5, 8 and 9, said four pairs of arms being on the same level and radial to the post.

The outer ends of each pair of supporting arms are connected by stop plates 12 secured in place by cap screws 13 and 14 inserted through the plates and tapped into the ends of the arms.

A head 15 is slidingly mounted upon the arms 4 and 5, a similar head 16 is slidingly mounted upon the arms 6 and 7, a third head 17 is slidingly mounted upon the arms 8 and 9, and a fourth head 18 is slidingly mounted upon the arms 10 and 11.

The heads 15, 16, 17 and 18 are substantially alike and each comprises a shelf 19 having a flat upper face 20, arms 21 and 22 extending downwardly from the ends of the shelf, a brace 23 connecting the lower ends of the arms 21 and 22, and an abutment 24 extending upwardly from the arm 22 and having a vertical rim engaging face 25 upon its outer side, there being a slot 26 extending from the lower side of the corrugated face 25 between the abutment 24 and the face 20 of the shelf. When the heads 15, 16, 17 and 18 are forced out by the screws, the heads engage the tire rim and force the tire rim back into place against the tire beads.

Each sliding head carries a rim engaging hook comprising a flat plate 27 fitting loosely in the slot 26, and a hooked end 28 turned upwardly from the outer edge of the plate. These hooks engage under the edge of the tire rim and contract the rim, the head 15 draws the joint out of line, and the heads 16 and 18 move inwardly, thus contracting the rim, and the tire can be lifted off. A bolt 29 is inserted downwardly through the abutment 24 and through the plate 27 into the shelf 19. The inner end 30 of the plate 27 is rounded so that the hook 28 may be swung outwardly to a radial position to engage a rim or it may be swung laterally to a position at right angles to the radial position so as to be out of the way of the rim and tire.

An operating screw 31 is screw-threaded through the arms 21 and 22 of the sliding head 15 between the arms 4 and 5, with its inner end swiveled in the upper end of the post 3 and its outer end rotatably mounted through the plate 12, there being a shoulder 32 upon the end of the screw bearing against the inner face of the plate 12 to hold the screw from endwise motion. The outer end of the screw is reduced beyond the shoulder 32, the reduced part passing through the plate 12 and being bent to form a crank handle 33 for operating the screw, so that by the operation of the handle 33 the head 15 is moved inwardly or outwardly upon the supporting arms 4 and 5. In a like manner a second operating screw 34 is provided for the head 16, a third operating screw 35 is provided for the head 17, and a fourth operating screw 36 is provided for the head 18. The screws 34 and 36 are preferably made on a single rod with right and left threads, so that they may be operated simultaneously from either end.

A stud 37 is rotatably connected at the center of the upper face of the post 3. An arm 38 is pivotally connected to the upper end of the stud 37 by a pin 39, and a fifth head 40 is slidingly mounted upon the arm 38 and held in its adjusted position by a crank handle set-screw 41. A roller 42 is mounted between bearings 43 extending downwardly from the fifth head 40. A piece of round iron is bent right angle shaped and one arm 44 of the angle is inserted through the bearings 43 and through the roller 42 and held in place by a cotter pin 45. The central portion 46 of the angle extends some distance, a 45% angle, and the second arm 47 is adapted to be inserted under the edge of the casing to assist in separating the casing from the rim. This round iron and roller are for use on solid tire rims having clencher type tires, or on rims having one or two rings.

In the practical operation of demounting a casing from a rim, the cranks 33 are operated to move the heads 15, 16, 17 and 18 to proper positions and then the tire 48 carrying the rim 49 is placed in position so that the hooks 28 will engage under the rim 49, as shown in Fig. 2, with the break 50 in the rim in front of the head 15, as shown in Fig. 1. Then a crank arm 33 is manipulated to move the head inwardly, thereby disconnecting the ends of the rim 49 at the break 50 and moving one end inwardly as shown in Fig. 3. This will allow the rim to contract slightly, the meeting ends overlapping each other. Then the fifth head 40 is adjusted upon the arm 38 to bring the roller 42 in position to engage the casing 48 just outside of the portion of the rim which has been swung inwardly. Then the operator will press downwardly on the outer end of the arm 38 and swing the arm to cause the roller 42 to travel along the casing and press the casing bead 51 loose from the rim 49. Then this bead will be pried outwardly and the arm 47 of the U-shaped bar will be inserted under the bead, and continued operation will disconnect the bead from the rim and raise the bead above the rim, as shown in Fig. 4. At the proper time another crank 33 is operated to move the head 16 inwardly and then the head 17 is moved inwardly and the head 18 may be moved inwardly if necessary and the roller 42 travels around the rim until the tire is entirely disconnected and the rim is compressed, and the tire may be removed.

In the practical operation of mounting a tire upon a rim, the heads 15, 16, 17 and 18 are moved inwardly, the hooks 28 are swung laterally, and the rim is placed upon the shelves 20 against the faces 25 and contracted as much as is practical. Then the casing 48 is placed in position around the rim and the heads 15, 16, 17 and 18 are operated to move outwardly to expand the rim against the casing until the ends of the rim abut together at the joint 50. Then the rim may be released and the tire is mounted.

Various changes may be made in the details of construction without departing from the spirit of my invention as claimed.

I claim:

1. A tire mounter and demounter comprising a base, a post extending upwardly from the base, supporting arms extending radially horizontally from the upper end of the post, heads slidingly mounted upon the supporting arms, screws for operating the heads, and hooks pivotally connected to the heads and adapted to swing into radial planes and engage a tire rim and to swing laterally out of engagement with the tire rim.

2. In a tire mounter and demounter, means for supporting a tire casing and rim in a horizontal position, means for compressing the rim, a swivel at the axial center of the rim, an arm pivoted to the swivel, a head slidingly and adjustably mounted upon the arm and a roller carried by the head and adapted to engage the casing outside of the rim and loosen the bead from the rim after the rim has been compressed.

3. In a tire mounter and demounter, means for supporting a tire casing and rim in a horizontal position, means for compressing the rim, a swivel at the axial center of the rim, an arm pivoted to the swivel, a head slidingly and adjustably mounted upon the arm, a roller carried by the head and adapted to engage the casing outside of the rim and loosen the bead from the rim after the rim has been compressed, and an angle-arm connected to the head to follow the roller and raise the bead out of its seat in the rim after the bead has been loosened from the rim and the rim has been compressed.

4. A tire mounter and demounter comprising a base, a post extending upwardly from the base, supporting arms extending radially and horizontally from the upper end of the post, heads slidingly mounted upon the supporting arms and having shelves adapted to support a pneumatic tire and having faces extending upwardly from the shelves above the supporting arms and adapted to engage the inner face of a pneumatic tire rim, and screws for operating the heads mounted in the supporting arms below the shelves.

In testimony whereof I have signed my name to this specification.

JOSEPH J. RISCHARD.